US010752092B2

(12) United States Patent
Choi et al.

(10) Patent No.: US 10,752,092 B2
(45) Date of Patent: Aug. 25, 2020

(54) VEHICULAR HEAT PUMP SYSTEM

(71) Applicant: HANON SYSTEMS, Daejeon (KR)

(72) Inventors: Young Ho Choi, Daejeon (KR); Chan Joo Maeng, Daejeon (KR); Seung Ho Lee, Daejeon (KR); Jung Jae Lee, Daejeon (KR); Hak Kyu Kim, Daejeon (KR); Sung Ho Kang, Daejeon (KR); Jae Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 38 days.

(21) Appl. No.: 15/558,210

(22) PCT Filed: Mar. 15, 2016

(86) PCT No.: PCT/KR2016/002550
§ 371 (c)(1),
(2) Date: Sep. 14, 2017

(87) PCT Pub. No.: WO2016/148476
PCT Pub. Date: Sep. 22, 2016

(65) Prior Publication Data
US 2018/0065451 A1    Mar. 8, 2018

(30) Foreign Application Priority Data
Mar. 16, 2015  (KR) .................. 10-2015-0036019

(51) Int. Cl.
*B60H 1/32* (2006.01)
*B60H 1/00* (2006.01)
(Continued)

(52) U.S. Cl.
CPC ....... *B60H 1/3213* (2013.01); *B60H 1/00907* (2013.01); *B60H 1/00921* (2013.01);
(Continued)

(58) Field of Classification Search
CPC .. B60H 1/3213; B60H 1/143; B60H 1/00921; B60H 1/00907; B60H 1/3229;
(Continued)

(56) References Cited

U.S. PATENT DOCUMENTS 5,641,016 A * 6/1997 Isaji .................. B60H 1/00007
165/43
6,047,770 A * 4/2000 Suzuki .............. B60H 1/00007
165/202
(Continued)

FOREIGN PATENT DOCUMENTS

JP         2006242502 A     9/2006
KR      20080098936 A    11/2008
(Continued)

OTHER PUBLICATIONS

Google Translation of KR20140098890, Jan. 7, 2019 (Year: 2019).*
(Continued)

*Primary Examiner* — Paul Alvare
*Assistant Examiner* — Kirstin U Oswald
(74) *Attorney, Agent, or Firm* — Dickinson Wright PLLC

(57) ABSTRACT

The present invention relates to a vehicular heat pump system and, more specifically, to a vehicular heat pump system having a chiller for heat exchanging cooling water circulating through vehicle electrical equipment (200), a refrigerant discharged from an outdoor heat exchanger so as to flow through a first bypass line (R1), and a refrigerant discharged from an indoor heat exchanger, thereby: in the air conditioner mode, increasing sub-cool while the refrigerant discharged from the indoor heat exchanger is first cooled at the chiller and then is second cooled at the outdoor heat exchanger such that the flow rate of refrigerants increases and cooling performance is improved; in the heat pump mode, allowing the refrigerant discharged from the indoor heat exchanger to ensure sub-cool in the chiller so as to increase the flow rate of refrigerants, and allowing the refrigerant discharged from the outdoor heat exchanger to receive an additional heating source from the chiller so as to improve heating performance; and, even in the defrost mode carried out because of frost on the outdoor heat exchanger,
(Continued)

ensuring an additional heating source in the chiller so as to minimize a change in indoor discharge temperature because of a lack of heating sources.

9 Claims, 8 Drawing Sheets

(51) Int. Cl.
  *B60H 1/22* (2006.01)
  *B60H 1/14* (2006.01)
  *F25B 40/00* (2006.01)
  *F25B 41/04* (2006.01)
  *F25B 5/04* (2006.01)
  *F25B 47/02* (2006.01)

(52) U.S. Cl.
  CPC ............... *B60H 1/143* (2013.01); *B60H 1/22* (2013.01); *F25B 5/04* (2013.01); *F25B 40/00* (2013.01); *F25B 41/04* (2013.01); *F25B 47/022* (2013.01); *B60H 2001/00949* (2013.01); *F25B 2400/0409* (2013.01); *F25B 2400/0411* (2013.01)

(58) Field of Classification Search
  CPC ............ B60H 1/22; B60H 2001/00949; B60H 1/00278; B60H 1/00271; B60H 1/323; F25B 30/02
  USPC ......................................................... 62/238.6
  See application file for complete search history.

(56) References Cited

U.S. PATENT DOCUMENTS

| | | | | |
|---|---|---|---|---|
| 6,293,123 B1* | 9/2001 | Iritani | .................. | B60H 1/3205 62/197 |
| 6,347,528 B1* | 2/2002 | Iritani | ................ | B60H 1/00357 62/324.6 |
| 6,920,922 B2* | 7/2005 | Takeuchi | ........... | B60H 1/00921 165/202 |
| 7,182,129 B2* | 2/2007 | Karl | .................... | B60H 1/00007 165/202 |
| 7,231,776 B2* | 6/2007 | Casar | ................. | B60H 1/00899 165/41 |
| 2012/0217625 A1* | 8/2012 | Mohan | .................... | H01L 23/66 257/664 |
| 2012/0318012 A1* | 12/2012 | Choi | .................. | B60H 1/00921 62/129 |
| 2013/0139528 A1* | 6/2013 | Katayama | .......... | B60H 1/00921 62/81 |
| 2013/0312442 A1* | 11/2013 | Suzuki | ............... | B60H 1/00921 62/160 |
| 2013/0319029 A1* | 12/2013 | Sekiya | ............... | B60H 1/00899 62/238.7 |
| 2014/0020415 A1* | 1/2014 | Heyl | ....................... | F25B 13/00 62/119 |
| 2014/0069123 A1* | 3/2014 | Kim | ........................ | F25B 49/02 62/61 |
| 2014/0290296 A1* | 10/2014 | Katoh | ................ | B60H 1/00042 62/238.7 |
| 2015/0096319 A1* | 4/2015 | Kang | ........................ | F25B 6/04 62/126 |
| 2016/0318373 A1* | 11/2016 | Kang | .................. | B60H 1/00342 |

FOREIGN PATENT DOCUMENTS

| | | |
|---|---|---|
| KR | 20090102478 A | 9/2009 |
| KR | 101340471 B1 | 12/2013 |
| KR | 101342931 B1 | 12/2013 |
| KR | 20140098890 A | 8/2014 |

OTHER PUBLICATIONS

International Search Report and Written Opinion dated Jun. 24, 2016 from International Patent Application Serial No. PCT/KR2016/002550, with English translation of International Search Report.

\* cited by examiner

Prior ART

Related art
(Heat pump mode)

Present invention
(Heat pump mode)

Orifice function
(Expansion)

On-off valve function
(Unexpansion)

VEHICULAR HEAT PUMP SYSTEM

CROSS-REFERENCE TO RELATED APPLICATIONS

This application is a U.S. National Stage of International Application No. PCT/KR2016/002550, filed Mar. 15, 2016, which claims the benefit and priority of KR 10-2015-0036019 filed Mar. 16, 2015. The entire disclosures of each of the above applications are incorporated herein by reference.

TECHNICAL FIELD

The present invention relates to a vehicular heat pump system, and more particularly, to a vehicular heat pump system, which includes a chiller for exchanging heat among coolant which circulates through electronic units 200 of the vehicle, a refrigerant which is discharged from an outdoor heat exchanger and flows in a first bypass line R1, and a refrigerant which is discharged from an indoor heat exchanger.

BACKGROUND ART

In general, an air conditioner for a vehicle includes a cooling system for cooling the interior of the vehicle and a heating system for heating the interior of the vehicle.

At an evaporator side of a refrigerant cycle, the cooling system converts air into cold air by exchanging heat between the air passing outside an evaporator and a refrigerant flowing inside the evaporator so as to cool the interior of the vehicle. At a heater core side of a coolant cycle, the heating system converts air into warm air by exchanging heat between the air passing outside the heater core and coolant flowing inside the heater core so as to heat the interior of the vehicle.

In the meantime, differently from the vehicle air conditioner, a vehicular heat pump system which can selectively carry out cooling and heating by converting a refrigerant flow direction using one refrigerant cycle has been applied. For instance, the heat pump system includes two heat exchangers (one being an indoor heat exchanger mounted inside an air-conditioning case for exchanging heat with air blown to the interior of the vehicle; and the other one being an outdoor heat exchanger for exchanging heat outside the air-conditioning case), and a direction changing valve for changing a refrigerant flow direction. Therefore, according to the flow direction of the refrigerant by the direction changing valve, the indoor heat exchanger serves as a heat exchanger for cooling when the cooling mode is operated, and serves as a heat exchanger for heating when the heating mode is operated.

Various kinds of the vehicular heat pump systems have been proposed, and FIG. 1 illustrates a representative example of the vehicular heat pump system.

As shown in FIG. 1, the vehicular heat pump system includes: a compressor 30 for compressing and discharging a refrigerant; an indoor heat exchanger 32 for radiating heat of the refrigerant discharged from the compressor 30; a first expansion valve 34 and a first bypass valve 36 mounted in parallel for selectively passing the refrigerant passing through the indoor heat exchanger 32; an outdoor heat exchanger 48 for exchanging heat with the refrigerant passing through the first expansion valve 34 or the first bypass valve 36 outdoors; an evaporator 60 for evaporating the refrigerant passing through the outdoor heat exchanger 48; an accumulator 62 for dividing the refrigerant passing through the evaporator 60 into a gas-phase refrigerant and a liquid-phase refrigerant; an inside heat exchanger 50 for exchanging heat between the refrigerant supplied to the evaporator 60 and the refrigerant returning to the compressor 30; a second expansion valve 56 for selectively expanding the refrigerant supplied to the evaporator 60; and a second bypass valve 58 mounted in parallel with the second expansion valve 56 for selectively connecting an outlet side of the outdoor heat exchanger 48 and an inlet side of the accumulator 62.

In FIG. 1, the reference numeral 10 designates an air-conditioning case in which the indoor heat exchanger 32 and the evaporator 60 are embedded, the reference numeral 12 designates a temperature-adjustable door for regulating a mixed amount of cold air and warm air, and the reference numeral 20 designates a blower mounted at an inlet of the air-conditioning case.

According to the heat pump system having the above structure, when a heat pump mode (heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the indoor heat exchanger 32, the first expansion valve 34, the outdoor heat exchanger 48, a high pressure part 52 of the inside heat exchanger 50, the second bypass valve 58, the accumulator 62 and a low pressure part 54 of the inside heat exchanger 50 in order, and then, is returned to the compressor 30. That is, the indoor heat exchanger 32 serves as a heater and the outdoor heat exchanger 48 serves as an evaporator.

When an air-conditioning mode (cooling mode) is operated, the first bypass valve 36 and the second expansion valve 56 are opened, and the first expansion valve 34 and the second bypass valve 58 are closed. Furthermore, the temperature-adjustable door 12 closes a path of the indoor heat exchanger 32. Therefore, the refrigerant discharged from the compressor 30 passes through the indoor heat exchanger 32, the first bypass valve 36, the outdoor heat exchanger 48, the high pressure part 52 of the inside heat exchanger 50, the second expansion valve 56, the evaporator 60, the accumulator 62 and the low pressure part 54 of the inside heat exchanger 50 in order, and then, is returned to the compressor 30. That is, the indoor heat exchanger 32 closed by the temperature-adjustable door 12 serves as a heater in the same with the heat pump mode.

However, in the case of the conventional vehicular heat pump system, in the heat pump mode, the indoor heat exchanger 32 mounted inside the air-conditioning case 10 serves as a heater to carry out heating and the outdoor heat exchanger 48 mounted outside the air-conditioning case 10, namely, in front of the engine room of the vehicle, serves as an evaporator to exchange heat with outdoor air.

In this instance, when temperature of the surface of the outdoor heat exchanger 48 falls below the freezing point while the refrigerant flows induced into the outdoor heat exchanger 48 exchanges heat with outdoor air, frosting is formed on the surface of the outdoor heat exchanger 48.

When frosting on the surface of the outdoor heat exchanger 48 keeps expansion, because the outdoor heat exchanger 48 cannot absorb heat, temperature and pressure of the refrigerant inside the system lower and temperature of the air discharged from the interior of the vehicle also lowers so as to remarkably reduce heating performance of the system, and a liquid-phase refrigerant may be induced into the compressor so as to deteriorate stability of the system.

Therefore, the conventional vehicular heat pump system stops operation of the heat pump system when frosting is formed on the surface of the outdoor heat exchanger 48, and then, controls to reoperate the system when frosting is removed. As described above, because the operation of the heat pump system is stopped when frosting is generated, it deteriorates heating performance. In this instance, when an electric heater is operated for heating, consumption of electric power increases and it causes decrease in mileage of electric vehicles or hybrid vehicles.

In order to solve the above-mentioned problems, Korean Patent No. 1342931 discloses 'heat pump system for vehicle' which has been filed by the same inventor as the present invention. In Korean Patent No. 1342931, when frosting is formed on the surface of the outdoor heat exchanger, the heat pump system carries out a defrosting mode in such a way that a refrigerant bypasses the outdoor heat exchanger to recover waste heat of electronic units of the vehicle through heat supplying means, namely, a chiller, such that the heat pump system can keep heating even though frosting is formed on the surface of the outdoor heat exchanger.

However, the conventional heat pump system has a disadvantage in that indoor discharge temperature lowers about 5° C. to 10° C. because the heat pump system uses just the waste heat of the electronic units of the vehicle as a heat source when frosting is formed on the surface of the outdoor heat exchanger, and in that a PTC heater must be additionally operated in order to keep indoor temperature.

Moreover, the conventional heat pump system has another disadvantage in that a refrigerant flow rate is reduced because the refrigerant discharged from the indoor heat exchanger is not condensed sufficiently, so it causes deterioration in heating performance and cooling performance.

DISCLOSURE

Technical Problem

Accordingly, the present invention has been made in view of the above-mentioned problems occurring in the prior art, and it is an object of the present invention to provide a vehicular heat pump system, which includes a chiller for exchanging heat among coolant which circulates through electronic units 200 of the vehicle, a refrigerant which is discharged from an outdoor heat exchanger and flows in a first bypass line R1, and a refrigerant which is discharged from an indoor heat exchanger, thereby increasing a refrigerant flow rate and improving cooling performance due to an increase of subcooling while the refrigerant discharged from the indoor heat exchanger is second cooled in the outdoor heat exchanger after being first cooled in the chiller in an air-conditioning mode, increasing the refrigerant flow rate because the refrigerant discharged from the indoor heat exchanger secures subcooling in the chiller in a heat pump mode, and improving heating performance because the refrigerant discharged from the outdoor heat exchanger receives additional heat source from the chiller. It is another object of the present invention to provide a vehicular heat pump system, which can minimize a change in indoor discharge temperature by a lack of heat sources by securing additional heat source from the chiller even in a defrosting mode due to frosting of the outdoor heat exchanger.

Technical Solution

To accomplish the above object, according to the present invention, there is provided a vehicular heat pump system including: a compressor mounted on a refrigerant circulation line for compressing and discharging refrigerant; an indoor heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an outdoor heat exchanger mounted outside the air-conditioning case for exchanging heat between the refrigerant circulating through the refrigerant circulation line and the outdoor air; a first expansion valve mounted on the refrigerant circulation line between the indoor heat exchanger and the outdoor heat exchanger to expand refrigerant; a second expansion valve mounted on the refrigerant circulation line (R) of an inlet side of the evaporator to expand the refrigerant; a first bypass line mounted on the refrigerant circulation line to connect the refrigerant circulation line of an inlet side of the second expansion valve with the refrigerant circulation line of an outlet side of the evaporator, such that the refrigerant circulating through the refrigerant circulation line bypasses the second expansion valve and the evaporator; and a chiller for exchanging heat among coolant, which circulates through vehicle electronic units, refrigerant, which is discharged from the outdoor heat exchanger and flows through the first bypass line, and refrigerant, which is discharged from the indoor heat exchanger. The refrigerant discharged from the indoor heat exchanger is first cooled in the chiller and is second cooled in the outdoor heat exchanger in an air-conditioning mode. Furthermore, the refrigerant discharged from the indoor heat exchanger secures subcooling in the chiller and the refrigerant discharged from the outdoor heat exchanger receives additional heat sources from the chiller.

Advantageous Effects

According to an embodiment of the present invention, because the vehicular heat pump system includes the chiller for exchanging heat among coolant which circulates through electronic units 200 of a vehicle, a refrigerant which is discharged from an outdoor heat exchanger and flows in a first bypass line R1, and a refrigerant which is discharged from an indoor heat exchanger, the heat pump system may increase a refrigerant flow rate and improving cooling performance due to an increase of subcooling while the refrigerant discharged from the indoor heat exchanger is second cooled in the outdoor heat exchanger after being first cooled in the chiller in the air-conditioning mode, increase the refrigerant flow rate because the refrigerant discharged from the indoor heat exchanger secures subcooling in the chiller in the heat pump mode, and improve heating performance because the refrigerant discharged from the outdoor heat exchanger receives additional heat source from the chiller.

Furthermore, the vehicular heat pump system according to the present invention may minimize a change in indoor discharge temperature by a lack of heat sources by securing additional heat source from the chiller even in a defrosting mode due to frosting of the outdoor heat exchanger.

MODE FOR INVENTION

Figure 1:
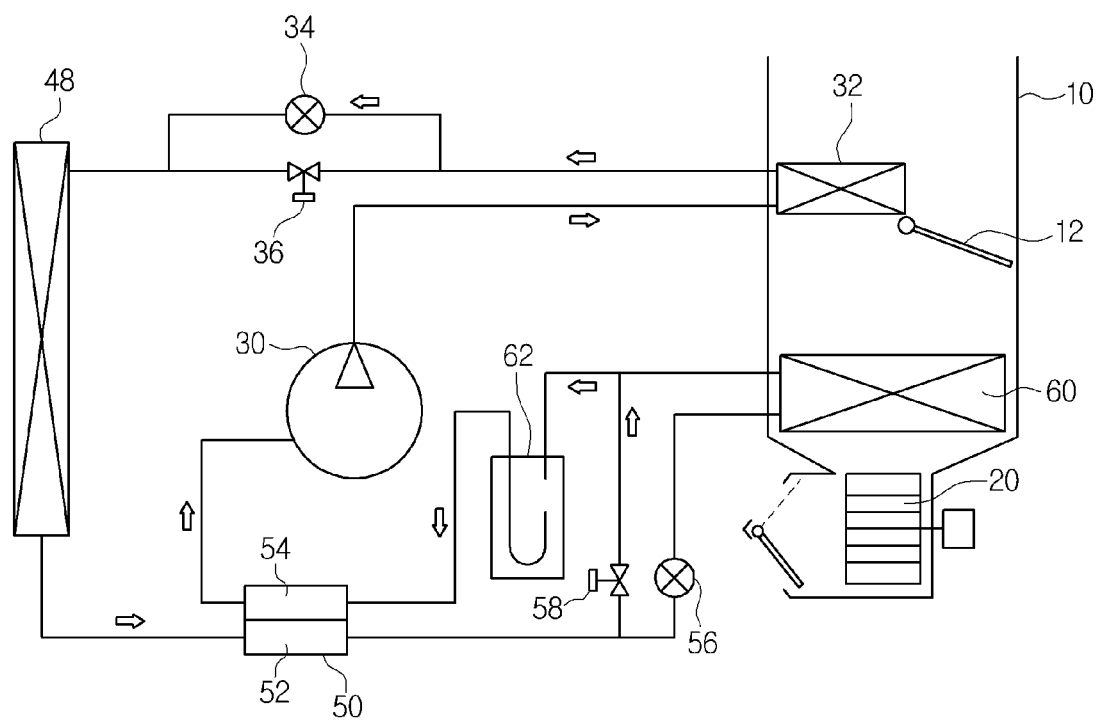
FIG. 1 is a configurative diagram of a conventional vehicular heat pump system.

Reference will be now made in detail to the preferred embodiment of the present invention with reference to the attached drawings.

First, a vehicular heat pump system according to the present invention includes a compressor 100, an indoor heat exchanger 110, a first expansion valve 120, an outdoor heat exchanger 130, a second expansion valve 140, and an evaporator 160 which are connected on a refrigerant circulation line R in order, and is preferably applied to electric vehicles or hybrid vehicles.

Moreover, on the refrigerant circulation line R, a first bypass line R1 bypassing the second expansion valve 140 and the evaporator 160 and a second bypass line R2 bypassing the outdoor heat exchanger 130 are connected and mounted in parallel. A first direction changing valve 191 is mounted at a branch point of the bypass line R1, a second direction changing valve 192 is mounted at a branch point of the second bypass line R2, and a chiller 180 is mounted on the first bypass line R1.

Figure 2:
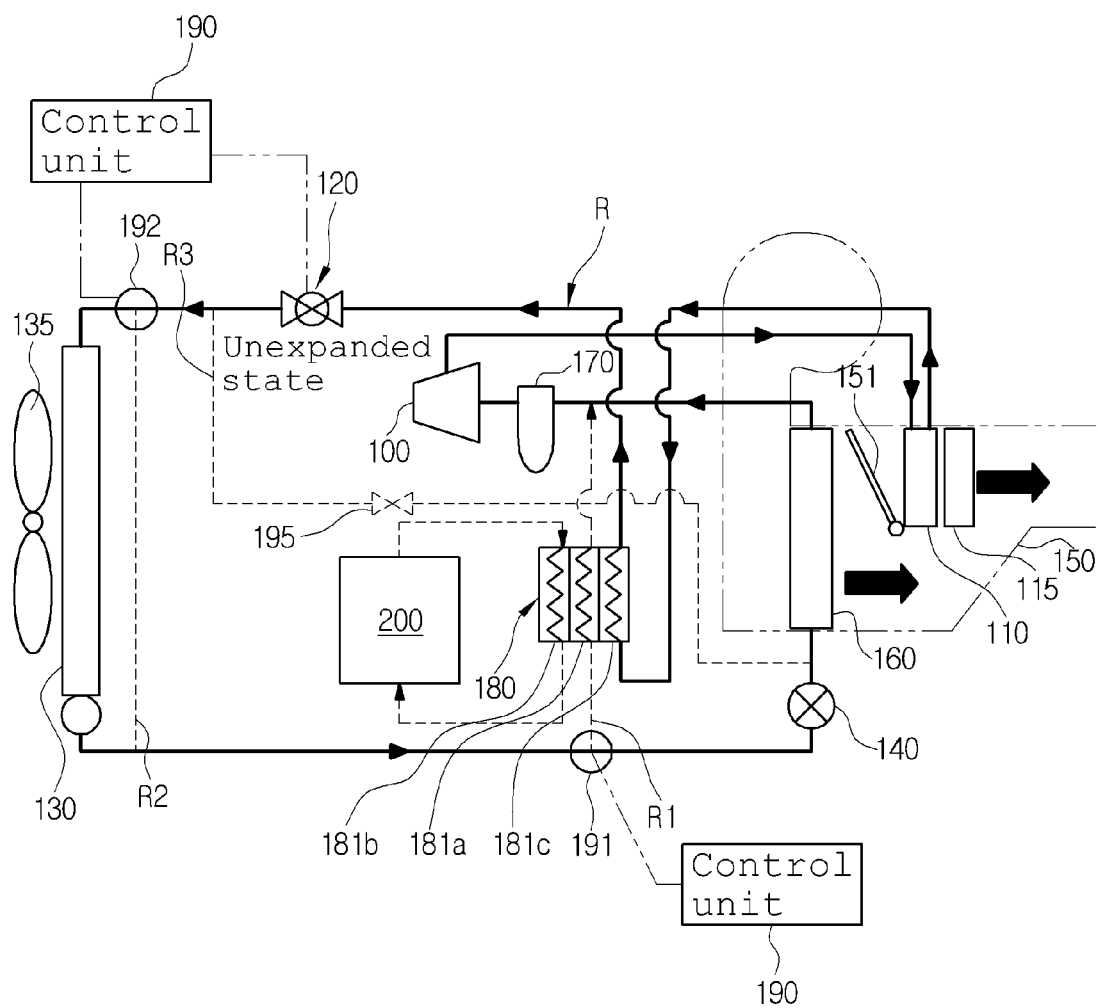
FIG. 2 is a configurative diagram of an air-conditioning mode of a vehicular heat pump system according to a preferred embodiment of the present invention.

Therefore, in an air-conditioning mode, as shown in FIG. 2, a refrigerant flow is controlled in such a way that a refrigerant discharged from the compressor 100 circulates through the indoor heat exchanger 110, the chiller 180, the outdoor heat exchanger 130, the second expansion valve 140, the evaporator 160, and the compressor 100 in order. In this instance, the indoor heat exchanger 110 serves as a condenser, and the evaporator 160 serves as an evaporator.

Furthermore, the chiller 180 and the outdoor heat exchanger 130 serve as condensers like the indoor heat exchanger 110.

In the meantime, in the air-conditioning mode, the refrigerant discharged from the chiller 180 passes the first expansion valve 120 in an unexpanded state by bypassing an orifice 128.

Figure 3:
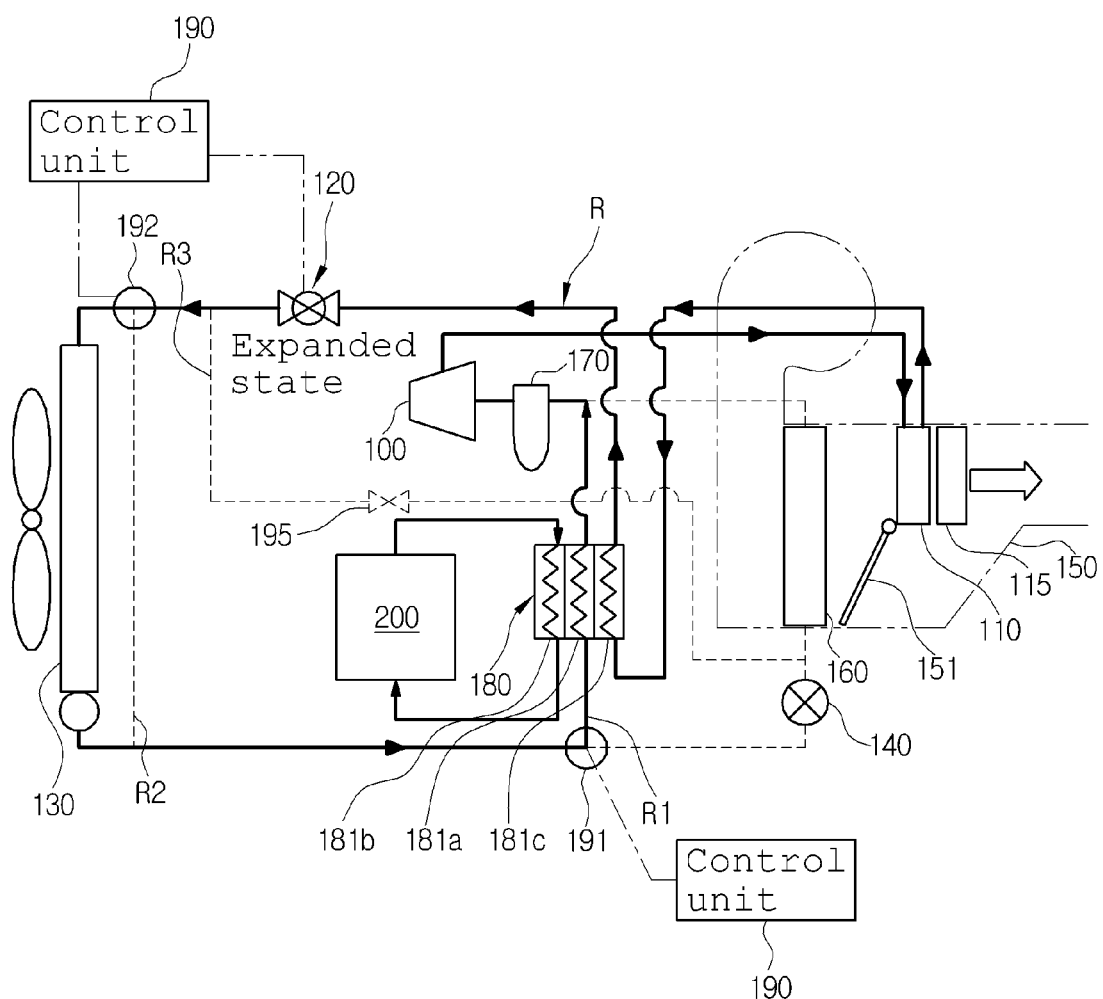
FIG. 3 is a configurative diagram of a heat pump mode of the vehicular heat pump system according to the preferred embodiment of the present invention.

In the heat pump mode, as shown in FIG. 3, a refrigerant flow is controlled in such a way that the refrigerant discharged from the compressor 100 circulates through the indoor heat exchanger 110, the chiller 180, the orifice 128 of the first expansion valve 120, the outdoor heat exchanger 130, the chiller 180 of the first bypass line R1, and the compressor 100 in order. In this instance, the indoor heat exchanger 110 serves as a condenser and the outdoor heat exchanger 130 serve as an evaporator. The refrigerant is not supplied to the second expansion valve 140 and the evaporator 160.

Additionally, the chiller 180 serves not only as a condenser but also as an evaporator. That is, the chiller 180 serves as a condenser relative to the refrigerant discharged from the interior heat exchanger 110 and serves as an evaporator relative to the refrigerant discharged from the outdoor heat exchanger 130.

Meanwhile, during dehumidification of the inside of the vehicle in the heat pump mode, because some of the refrigerant circulating through the refrigerant circulation line R is supplied to the evaporator 160 through a dehumidification line R3 which will be described later, the heat pump system can perform dehumidification inside the vehicle.

Hereinafter, components of the vehicular heat pump system according to the present invention will be described in detail.

First, the compressor 100 mounted on the refrigerant circulation line R inhales and compresses the refrigerant while operating by receiving a driving force from an engine (an internal combustion engine) or a motor, and then, discharges the refrigerant in a gas phase of high-temperature and high-pressure.

The compressor 100 inhales and compresses the refrigerant discharged from the evaporator 160 and supplies to the indoor heat exchanger 110 in the air-conditioning mode, and inhales and compresses the refrigerant discharged from the outdoor heat exchanger 130 and passing through the first bypass line R1 and supplies to the indoor heat exchanger 110 in the heat pump mode.

Moreover, in the dehumidification mode of the heat pump mode, because refrigerants are simultaneously supplied to the evaporator 160 through the first bypass line R1 and the dehumidification line R3, the compressor 100 inhales and compresses the refrigerants meeting after passing through the first bypass line R1 and the evaporator 160 and supplies the inhaled refrigerant to the indoor heat exchanger 110.

The indoor heat exchanger 110 is mounted inside the air-conditioning case 150 and connected with the refrigerant circulation line R of the outlet side of the compressor 100 so as to exchange heat between air flowing inside the air-conditioning case 150 and the refrigerant discharged from the compressor 100.

Furthermore, the evaporator 160 is mounted inside the air-conditioning case 150 and connected with the refrigerant circulation line R of the inlet side of the compressor 100 so as to exchange heat between the air flowing inside the air-conditioning case 150 and the refrigerant supplied to the compressor 100.

The indoor heat exchanger 110 serves as a condenser all in the air-conditioning mode and the heat pump mode.

The evaporator 160 serves as an evaporator in the air-conditioning mode, but is stopped in the heat pump mode because refrigerant is not supplied and serves as an evaporator in the dehumidification mode because some of the refrigerant is supplied.

Moreover, the indoor heat exchanger 110 and the evaporator 160 are spaced apart from each other at a predetermined interval inside the air-conditioning case 150, and in this instance, are mounted in order from the upstream side of the air flow direction inside the air-conditioning case 150.

Therefore, in the air-conditioning mode that the evaporator 160 serves as the evaporator, as shown in FIG. 2, the refrigerant of low-temperature and low-pressure discharged from the second expansion valve 140 is supplied to the evaporator 160, and in this instance, the air flowing inside the air-conditioning case 150 through a blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode that the indoor heat exchanger 110 serves as a condenser, as shown in FIG. 3, the refrigerant of high-temperature and high-pressure discharged from the compressor 100 is supplied to the indoor heat exchanger 110, and in this instance, the air flowing inside the air-conditioning case 150 through the blower (not shown) is converted into warm air by exchanging heat with the refrigerant of high-temperature and high-pressure of the indoor heat exchanger 110 while passing through the indoor heat exchanger 110, and then, is discharged to the interior of the vehicle to thereby heat the interior of the vehicle.

Moreover, a temperature-adjustable door 151 for adjusting an amount of air bypassing the indoor heat exchanger 110 and an amount of air passing through the indoor heat exchanger 110 is mounted between the evaporator 160 and the indoor heat exchanger 110 inside the air-conditioning case 150.

The temperature-adjustable door 151 adjusts the amount of the air bypassing the indoor heat exchanger 110 and the amount of the air passing through the indoor heat exchanger 110 to thereby properly control temperature of the air discharged from the air-conditioning case 150.

In this instance, in the air-conditioning mode, as shown in FIG. 2, when a front side passage of the indoor heat exchanger 110 is completely closed by the temperature-adjustable door 151, because the cold air passing through the evaporator 160 bypasses the indoor heat exchanger 110 and is supplied to the interior of the vehicle, the maximum heating is carried out. In the heat pump mode, as shown in FIG. 3, when a passage bypassing the indoor heat exchanger 110 is completely closed by the temperature-adjustable door 151, because all of the air is converted into warm air while passing through the indoor heat exchanger 110 serving as the condenser and the warm air is supplied to the interior of the vehicle, the maximum heating is carried out.

Furthermore, the outdoor heat exchanger 130 is mounted outside the air-conditioning case 150 and connected with the refrigerant circulation line R so as to exchange heat between the refrigerant circulating through the refrigerant circulation line R and the outdoor air.

Here, the outdoor heat exchanger 130 is mounted at the front side of an engine room of the vehicle to exchange heat between the refrigerant flowing inside the outdoor heat exchanger 130 and the outdoor air.

In the air-conditioning mode, the outdoor heat exchanger 130 serves as a condenser like the indoor heat exchanger 110 and the chiller 180. In this instance, the refrigerant of high temperature flowing inside the outdoor heat exchanger 130 is condensed while exchanging heat with outdoor air. In the heat pump mode, the outdoor heat exchanger 130 serves as an evaporator, and in this instance, the refrigerant of low temperature flowing inside the outdoor heat exchanger 130 is evaporated while exchanging heat with outdoor air.

Additionally, a fan 135, which compulsively sends the outdoor air toward the outdoor heat exchanger 130, is mounted at one side of the outdoor heat exchanger 130.

In addition, the first expansion valve 120 is mounted on the refrigerant circulation line R between the indoor heat exchanger 110 and the outdoor heat exchanger in order to selectively expand the refrigerant supplied to the outdoor heat exchanger 130 depending on the air-conditioning mode or the heat pump mode.

In more detail, in the present invention, because the refrigerant discharged from the indoor heat exchanger 110 flows into the first expansion valve 120 after passing through the chiller 180, the first expansion means valve 120 is mounted on the refrigerant circulation line R between the chiller 180 and the outdoor heat exchanger 130.

The first expansion valve 120 which is mounted on the refrigerant circulation line R includes an on-off valve 125 for controlling a flow of the refrigerant and an orifice 128 disposed on the on-off valve 125 to expand the refrigerant. The refrigerant flows in an unexpanded state when the on-off valve 125 is opened, but flows in an expanded state through the orifice 128 when the on-off valve 125 is closed.

In other words, the first expansion valve 120 has a structure that the orifice 128, which provides a throttling (expansion) action, is integrated with the on-off valve 125.

Figure 8:
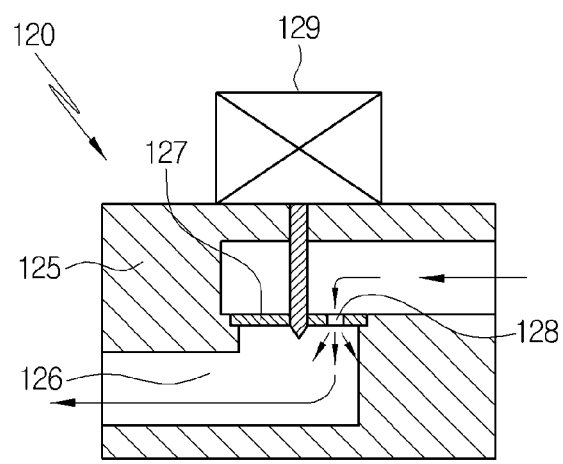
FIG. 8 is a schematic diagram showing an operated state of the first expansion valve in the vehicular heat pump system according to the preferred embodiment of the present invention.
Figure 8:
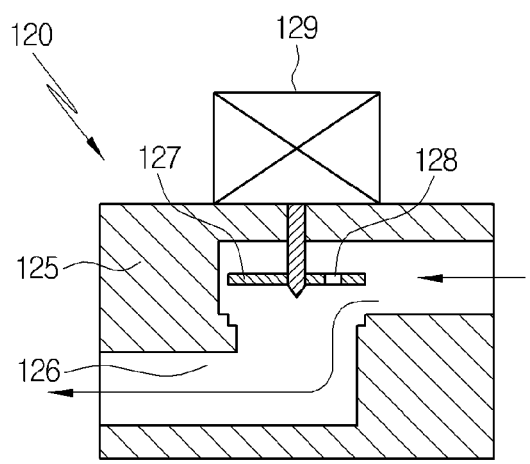

FIG. 8 is a schematic diagram of the first expansion valve 120. The first expansion valve 120 includes a flow passage 126, in which a refrigerant flows, is formed inside the on-off valve 125, and a valve member 127 for opening and closing the flow passage 126.

In this instance, the orifice 128 for expanding the refrigerant is formed on the valve member 127.

Moreover, a solenoid 129 for operating the valve member 127, which turns on and off the flow passage 126 is mounted at one side of the on-off valve 125.

Therefore, the refrigerant flows through the flow passage 126 in the unexpanded state (On-off valve function) when the valve member 127 of the first expansion valve 120 opens the flow passage 126, and flows through the orifice 128 in the expanded state when the valve member 127 of the first expansion valve 120 closes the flow passage 126 (Orifice function).

Furthermore, the first bypass line R1 is mounted to connect the refrigerant circulation line R at an inlet side of the second expansion valve 140 with the refrigerant circulation line R at an outlet side of the evaporator 160, such that the refrigerant circulating through the refrigerant circulation line R selectively bypasses the second expansion valve 140 and the evaporator 160.

As shown in the drawings, the first bypass line R1 is mounted to be in parallel with the second expansion valve 140 and the evaporator 160. That is, an inlet of the first bypass line R1 is connected with the refrigerant circulation line R, which connects the outdoor heat exchanger 130 with the second expansion valve 140, and an outlet of the first bypass line R1 is connected with the refrigerant circulation line R, which connects the evaporator 160 with the compressor 100.

Therefore, in the air-conditioning mode, the refrigerant passing through the outdoor heat exchanger 130 flows toward the second expansion valve 140 and the evaporator 160, but, in the heat pump mode, the refrigerant passing through the outdoor heat exchanger 130 directly flows toward the compressor 100 through the first bypass line R1 so as to bypass the second expansion valve 140 and the evaporator 160.

Here, a first direction changing valve 191 serves to change a flow direction of the refrigerant depending on the air-conditioning mode and the heat pump mode.

Of course, a control unit 190 controls components including not only the first direction changing valve 191 but also a second direction changing valve 192, the first and second expansion valve 120 and 140, and an on-off valve 195, which will be described later, to control the flow of the refrigerant circulating through the heat pump system depending on the air-conditioning mode and the heat pump mode.

The first direction changing valve 191 is mounted at the branch point of the first bypass line R1 and the refrigerant circulation line R, such that the refrigerant passing through the outdoor heat exchanger 130 depending on the air-conditioning mode or the heat pump mode changes the flow direction to flow toward the first bypass line R1 or the second expansion valve 140.

In the air-conditioning mode, the first direction changing valve 191 changes the flow direction of the refrigerant, which passed through the indoor heat exchanger 110, the chiller 180 and the outdoor heat exchanger 130 after being discharged from the compressor 100, toward the second expansion valve 140 and the evaporator 160. Additionally, in the heat pump mode, the first direction changing valve 191 changes the flow direction of the refrigerant, which passed through the indoor heat exchanger 110, the chiller 180, the first expansion valve 120 and the outdoor heat exchanger 130 after being discharged from the compressor 100, toward the first bypass line R1.

Meanwhile, the first direction changing valve 191 is mounted at the branch point at the inlet side of the first bypass line R1.

Moreover, the chiller 180 for exchanging heat among the coolant circulating through electronic units 200 of the vehicle, the refrigerant flowing through the first bypass line R1 and the refrigerant discharged from the indoor heat exchanger 110 is mounted.

In this instance, the chiller 180 is mounted to be located on the first bypass line R1, such that the refrigerant flowing through the first bypass line R1 exchanges heat with the waste heat of the electronic units 200 of the vehicle and the refrigerant of high-temperature and high-pressure discharged from the indoor heat exchanger 110.

The chiller 180 includes: a coolant heat exchanger 181*b* connected with the vehicle electronic units 200 through the refrigerant circulation line R; a first refrigerant heat exchanger 181*a* connected with the first bypass line R1; and a second refrigerant heat exchanger 181*c* connected with the refrigerant circulation line R located at the outlet side of the indoor heat exchanger 110.

In other words, the chiller 180 is a triple heat exchanger for exchanging heat among the coolant and the refrigerants.

In this instance, the chiller 180 is configured in such a way that the first refrigerant heat exchanger 181*a* is arranged between the coolant heat exchanger 181*b* and the second refrigerant heat exchanger 181*c*.

That is, in the heat pump mode, the refrigerant discharged from the outdoor heat exchanger 130 smoothly exchanges heat with the coolant of the coolant heat exchanger 181*b* and the refrigerant of the second refrigerant heat exchanger 181*c*, which are arranged at both sides of the first refrigerant heat exchanger 181*a* while passing through the first refrigerant 181*a* arranged in the middle of the chiller 180.

Therefore, in the air-conditioning mode, the refrigerant of high-temperature and high-pressure discharged from the indoor heat exchanger 110 is first cooled in the chiller 180, and then, is second cooled in the outdoor heat exchanger 130 so as to increase subcooling and expand the refrigerant flow rate, thereby improving cooling performance and reducing power consumption.

In the meantime, in the air-conditioning mode, any refrigerant is not supplied to the first bypass line R1, but the refrigerant discharged from the indoor heat exchanger 110 may be cooled using the refrigerant or the coolant filling the chiller 180. Of course, if necessary, the coolant circulating through the vehicle electronic units 200 may be circulated to the coolant heat exchanger 181*b* of the chiller 180.

Figure 6:
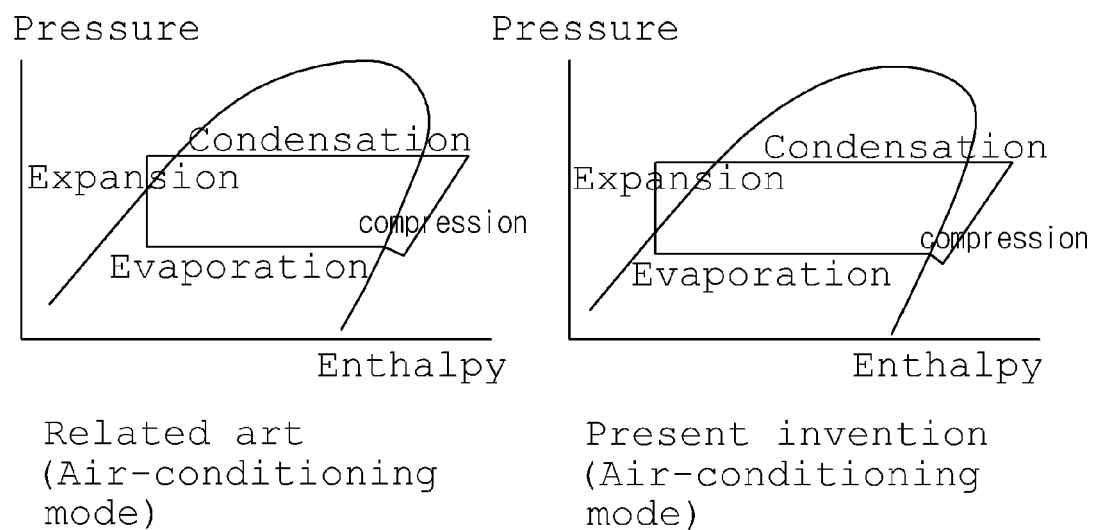
FIG. 6 shows graphs of pressure-enthalpy diagrams in the air-conditioning modes of the conventional vehicular heat pump system and the vehicular heat pump system according to the preferred embodiment of the present invention.

FIG. 6 shows pressure-enthalpy diagrams in the air-conditioning modes of the conventional heat pump system and the heat pump system according to the preferred embodiment of the present invention. As shown in FIG. 6, the refrigerant discharged from the indoor heat exchanger 110 is sufficiently condensed by being first and second cooled through the chiller 180 and the outdoor heat exchanger 130 so as to increase subcooling.

Moreover, in the heat pump mode, the refrigerant of high-temperature and high-pressure discharged from the indoor heat exchanger 110 ensures subcooling through heat exchange with the refrigerant discharged from the outdoor heat exchanger 130 in the chiller 180 so as to increase the refrigerant flow rate. The refrigerant of low-temperature and low-pressure discharged from the outdoor heat exchanger 130 receives additional heat source from waste heat of the vehicle electronic units (coolant) of the chiller 180 and the refrigerant discharged from the indoor heat exchanger 110 so as to increase heating performance due to increase of temperature and pressure of the refrigerant and increase of heat sources.

Figure 5:
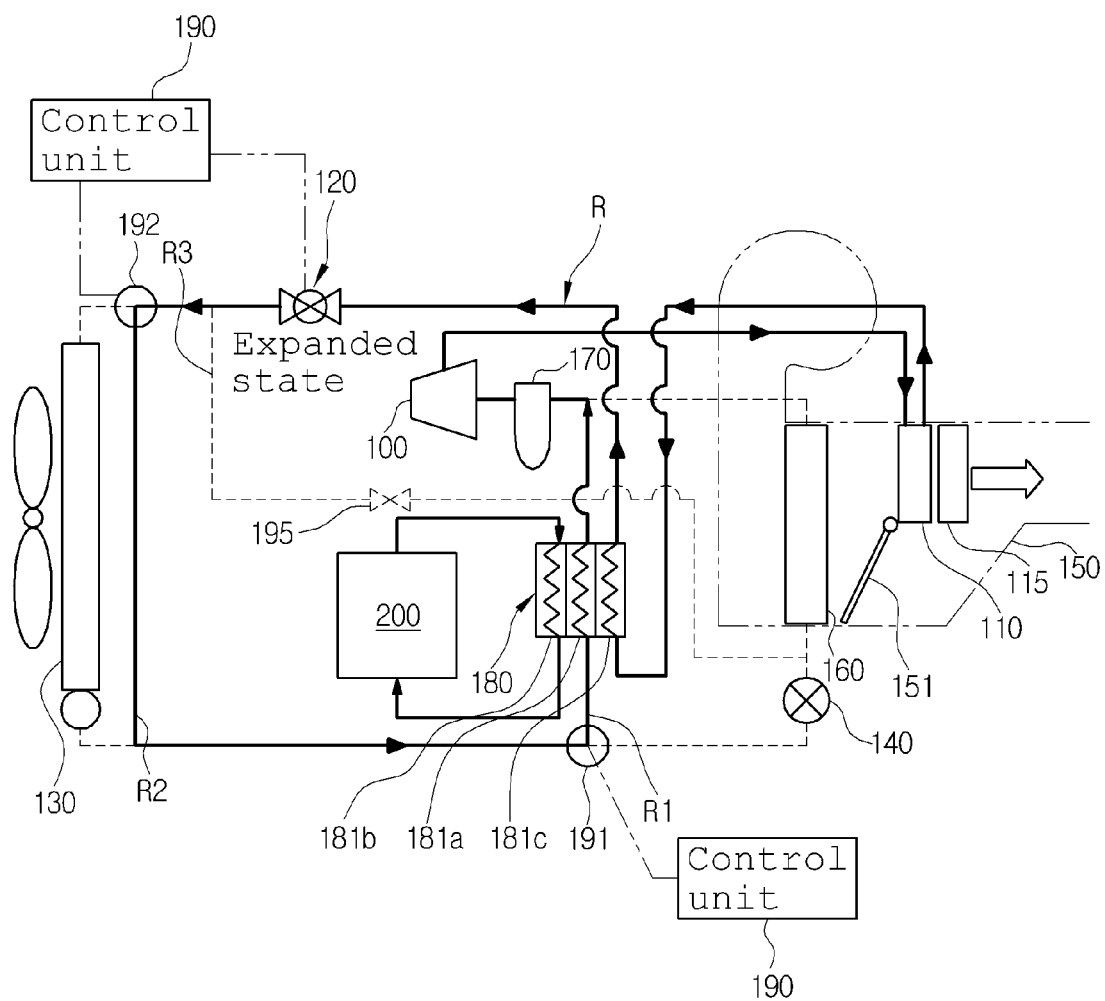
FIG. 5 is a configurative diagram of a defrosting mode while carrying out the heat pump mode of the vehicular heat pump system according to the preferred embodiment of the present invention.

Additionally, as shown in FIG. 5, even in the defrosting mode that the refrigerant bypasses the outdoor heat exchanger 130 due to frosting of the outdoor heat exchanger 130, because additional heat sources (waste heat of electronic units and refrigerant discharged from the indoor heat exchanger) may be secured, it may minimize a change in indoor discharge temperature because of a lack of heat sources, thereby reducing power consumption and increasing mileage of electric vehicles or hybrid vehicles by decreasing frequency of use of an electric heater 115.

Figure 7:
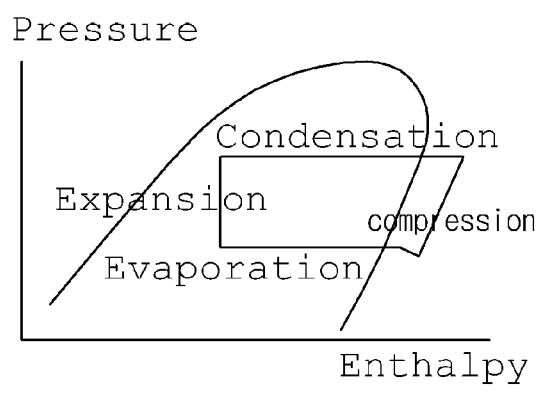
FIG. 7 shows graphs of pressure-enthalpy diagrams in the heat pump modes of the conventional vehicular heat pump system and the vehicular heat pump system according to the preferred embodiment of the present invention.
Figure 7:
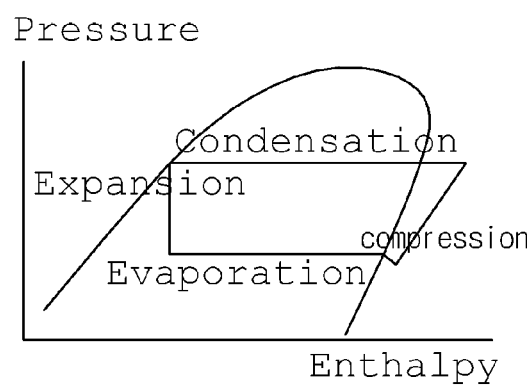

FIG. 7 shows graphs of pressure-enthalpy diagrams in the heat pump modes of the conventional vehicular heat pump system and the heat pump system according to the preferred embodiment of the present invention. As shown in FIG. 7, the refrigerant discharged from the indoor heat exchanger 110 is sufficiently condensed in the chiller 180 through heat exchange with the refrigerant discharged from the outdoor heat exchanger 130 so as to increase subcooling.

In the meantime, there are motors, inverters and others as the electronic units 200 of the vehicle.

Furthermore, an accumulator 170 is mounted on the refrigerant circulation line R located at the inlet side of the compressor 100.

The accumulator 170 divides the refrigerants supplied to the compressor 100 into a liquid-phase refrigerant and a gas-phase refrigerant, and then, supplies just the gas-phase refrigerant to the compressor 100.

Additionally, the electric heater 115 is mounted adjacent to the downstream side of the indoor heat exchanger 110 inside the air-conditioning case 150 in order to enhance heating performance.

That is, the heat pump system according to the preferred embodiment of the present invention may enhance heating performance by operating the electric heater 115 as an auxiliary heat source at the early stage of engine start, and may operate the electric heater 115 even when heat sources for heating lack.

It is preferable that the electric heater 115 is a PTC heater.

Moreover, on the refrigerant circulation line R, the second bypass line R2 is mounted in parallel, such that the refrigerant selectively passing through the first expansion valve 120 bypasses the outdoor heat exchanger 130. That is, the second bypass line R2 is mounted in parallel with the outdoor heat exchanger 130 by connecting the refrigerant circulation line R at the inlet side of the outdoor heat exchanger 130 and the refrigerant circulation line R at the outlet side with each other, such that the refrigerant circulating through the refrigerant circulation line R bypasses the outdoor heat exchanger 130.

Furthermore, a second direction changing valve 192 for changing a refrigerant flow direction is mounted in such a way that the refrigerant circulating through the refrigerant circulation line R selectively flows to the second bypass line R2. The second direction changing valve 192 is mounted at a branch point between the second bypass line R2 and the refrigerant circulation line R to change the refrigerant flow direction so that the refrigerant flows to the outdoor heat exchanger 130 or the second bypass line R2.

Additionally, on the refrigerant circulation line R, a dehumidification line R3 is mounted to supply some of the refrigerant circulating through the refrigerant circulation line R toward the evaporator 160 to carry out dehumidification inside the vehicle in the heat pump mode.

The dehumidification line R3 is mounted to supply some of the refrigerant of low-temperature passing through the first expansion valve 120 toward the evaporator 160.

That is, the dehumidification line R3 is mounted to connect the refrigerant circulation line R at the outlet side of the first expansion valve 120 with the refrigerant circulation line R at the inlet side of the evaporator 160.

In the drawings, an inlet of the dehumidification line R3 is connected to the refrigerant circulation line R between the first expansion valve 120 and the outdoor heat exchanger 130, such that some of the refrigerant before being induced into the outdoor heat exchanger 130 after passing through the first expansion valve 120 is supplied to the evaporator 160 after flowing the dehumidification line R3.

In other words, in the dehumidification line during operation of the heat pump mode, the refrigerant passing through the compressor 100, the indoor heat exchanger 110, the chiller 180 and the first expansion valve 120 is divided into two. Some of the divided refrigerant circulates toward the outdoor heat exchanger 130 and the first bypass line R1 and some of the refrigerant circulates toward the dehumidification line R3 and the evaporator 160, and then, the divided refrigerants meet at the inlet side of the compressor 100.

Moreover, on the dehumidification line R3, an on-off valve 195 is mounted to open and close the dehumidification line R3 in such a way that some of the refrigerant passing through the first expansion valve 120 flows to the dehumidification line R3 only in the dehumidification mode.

The on-off valve 195 opens the dehumidification line R3 only in the dehumidification mode and closes the dehumidification line R3 not in the dehumidification mode.

Meanwhile, an outlet of the dehumidification line R3 is connected with the refrigerant circulation line R at the inlet side of the evaporator 160, such that the refrigerant passing through the dehumidification line R3 is directly induced into the evaporator 160.

Furthermore, in the heat pump mode, when it is detected that frosting is formed on the outdoor heat exchanger 130, the control unit 190 controls the refrigerant flow in such a way that the refrigerant passing through the first expansion valve 120 flows to the second bypass line R2 so as to bypass the outdoor heat exchanger 130. That is, as shown in FIG. 5, the control unit 190 controls to carry out the defrosting mode by controlling the refrigerant flow in such a way that the refrigerant circulating through the refrigerant circulation line R circulates through the compressor 100, the indoor heat exchanger 110, the chiller 180, the first expansion valve 120, the second bypass line R2, the first bypass line R1 and the chiller 180 in order.

When the refrigerant bypasses the outdoor heat exchanger 130, it may delay frosting of the outdoor heat exchanger 130 or remove frost on the outdoor heat exchanger 130.

In the meantime, frosting on the outdoor heat exchanger 130 may be detected by various methods, for instance, the control unit may recognize that frosting is formed on the outdoor heat exchanger 130 when temperature of the refrigerant at the outlet side of the outdoor heat exchanger 130 is below zero degree.

Of course, the control unit may recognize frosting of the outdoor heat exchanger 130 by a separate sensor.

Hereinafter, the action of the vehicular heat pump system according to the preferred embodiment of the present invention will be described.

A. Air-Conditioning Mode (Cooling Mode) (See FIG. 2)

In the air-conditioning mode (cooling mode), as shown in FIG. 2, the second bypass line R2 is closed by the second direction changing valve 192, the first bypass line R1 is also closed by the first direction changing valve 191, and the valve member 127 of the first expansion valve 120 opens the passage 126, such that the refrigerant flows in the unexpanded state.

Moreover, coolant circulating through the electronic units 200 is not supplied to the chiller 180.

Meanwhile, in the maximum cooling, the temperature adjustable door 151 inside the air-conditioning case 150 closes the path passing through the indoor heat exchanger 110, so that the air blown into the air-conditioning case 150 by the blower is cooled while passing through the evaporator 160 and bypasses the indoor heat exchanger 110 to be supplied to the interior of the vehicle, thereby cooling the interior of the vehicle.

Continuously, a refrigerant circulation process will be described.

The gas-phase refrigerant of high-temperature and high-pressure discharged after being compressed in the compressor 100 is supplied to the indoor heat exchanger 110 mounted inside the air-conditioning case 150.

As shown in FIG. 2, the refrigerant supplied to the indoor heat exchanger 110 does not exchange heat with air but is directly supplied to the second refrigerant heat exchanger 181c of the chiller 180 because the temperature-adjustable door 151 closes a path of the indoor heat exchanger 110.

The refrigerant supplied to the second refrigerant heat exchanger 181c of the chiller 180 is first cooled and condensed by exchanging heat with the refrigerant and coolant filling the chiller 180, and then, passes through the first expansion valve 120 in the unexpanded state and flows toward the outdoor heat exchanger 130.

The refrigerant flowing to the outdoor heat exchanger 130 is second cooled and condensed while exchanging heat with outdoor air.

Continuously, the refrigerant passing through the outdoor heat exchanger 130 is decompressed and expanded while passing through the second expansion valve 140 so as to become a liquid-phase refrigerant of low-temperature and low-pressure, and then, is induced into the evaporator 160.

The refrigerant induced into the evaporator 160 is evaporated by exchanging heat with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is induced into the compressor 100 and recirculates the above cycle.

B. Heat Pump Mode (See FIG. 3)

In the heat pump mode, as shown in FIG. 3, the second bypass line R2 is closed by the second direction changing valve 192 and the first bypass line R1 is opened by the first direction changing valve 191, such that the refrigerant is not supplied to the second expansion valve 140 and the evaporator 160.

Moreover, the valve member 127 of the first expansion valve 120 closes the passage 126, such that the refrigerant is expanded while passing the orifice 128.

Meanwhile, the coolant heated by the vehicle electronic units 200 is supplied to the coolant heat exchanger 181b of the chiller 180.

Additionally, in the first heating mode, the temperature adjustable door 151 inside the air-conditioning case 150 is operated to close the path bypassing the indoor heat exchanger 110, so that the air blown into the air-conditioning case 150 by the blower is changed into warm air while passing through the indoor heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is induced into the indoor heat exchanger 110 mounted inside the air-conditioning case 150.

The gas-phase refrigerant of high-temperature and high-pressure induced into the indoor heat exchanger 110 is cooled and condensed while exchanging heat with the air blown into the air-conditioning case 150 by the blower, and in this instance, the air passing through the indoor heat exchanger 110 is converted into warm air and supplied to the interior of the vehicle to heat the interior of the vehicle.

Continuously, the refrigerant discharged from the indoor heat exchanger 110 is supplied to the second refrigerant heat exchanger 181c of the chiller 180, and the refrigerant supplied to the second refrigerant heat exchanger 181c of the chiller 180 is additionally cooled while exchanging heat with the refrigerant of low-temperature and low-pressure, which is discharged from the outdoor heat exchanger 130 and flows through the first refrigerant heat exchanger 181a, and then, flows to the first expansion valve 120.

The refrigerant flowing to the first expansion valve 120 is decompressed and expanded while passing through the orifice 128 to become a liquid-phase refrigerant of low-temperature and low-pressure, and then, is supplied to the outdoor heat exchanger 130, which serves as an evaporator.

The refrigerant supplied to the outdoor heat exchanger 130 is evaporated while exchanging heat with the outdoor air, and then, passes through the first bypass line R1 by the first direction changing valve 191. In this instance, the refrigerant passing through the first bypass line R1 receives heat sources by exchanging heat with the coolant passing through the coolant heat exchanger 181b and the refrigerant passing through the second refrigerant heat exchanger 181c while passing through the first refrigerant heat exchanger 181a of the chiller 180, and then, is induced into the compressor 100 such that the above-mentioned cycle is re-circulated.

Figure 4:
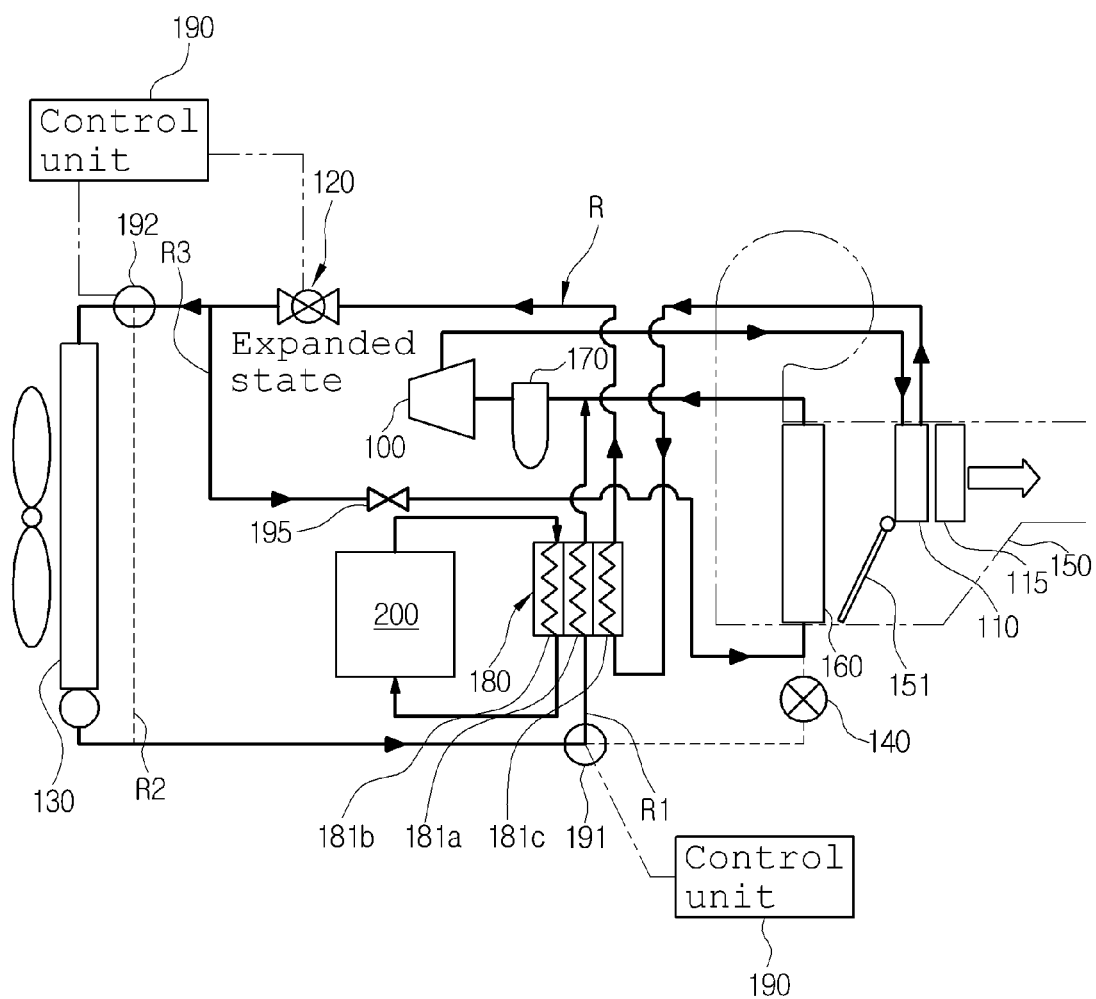
FIG. 4 is a configurative diagram of a dehumidification mode while carrying out the heat pump mode of the vehicular heat pump system according to the preferred embodiment of the present invention.

C. Dehumidification Mode of Heat Pump Mode (See FIG. 4)

The dehumidification mode of the heat pump mode is operated only in the case that dehumidification of the interior of the vehicle is needed while the system is operated in the heat pump mode of FIG. 3.

Therefore, only different parts from the first heating mode of FIG. 3 will be described.

In the dehumidification mode, the dehumidification line R3 is additionally opened by the on-off valve 195 in the state where the first heating mode is operated.

Moreover, the temperature-adjustable door 151 inside the air-conditioning case 150 closes a passageway bypassing the indoor heat exchanger 110. Therefore, air blown into the air-conditioning case 150 by a blower is cooled while passing the evaporator 160, and then, is changed into warm air while passing the indoor heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

Some of the refrigerant passing the compressor 100, the indoor heat exchanger 110, the chiller 180, and the orifice 128 of the first expansion valve 120 passes the outdoor heat exchanger 130, and some of the refrigerant passes the dehumidification line R3.

The refrigerant passing the outdoor heat exchanger 130 is evaporated while exchanging heat with the outdoor air, and then, passes the first bypass line R1 by the first direction changing valve 191. In this instance, the refrigerant passing the first bypass line R1 receives heat sources and is evaporated by exchanging heat with the coolant passing through the coolant heat exchanger 181b and the refrigerant passing through the second refrigerant heat exchanger 181c while passing through the first refrigerant heat exchanger 181a of the chiller 180.

The refrigerant passing the dehumidification line R3 is supplied to the evaporator 160, and is evaporated while exchanging heat with the air flowing inside the air-conditioning case 150.

In the above process, the air passing the evaporator 160 is dehumidified, and the dehumidified air is changed into warm air while passing the indoor heat exchanger 110, and then, is supplied to the interior of the vehicle so as to carry out dehumidification.

After that, the refrigerants respectively passing the chiller 180 and the evaporator 160 meet together and are induced into the compressor 100, and then, the above-mentioned cycle is re-circulated.

D. Defrosting Mode During Heat Pump Mode (See FIG. 5)

The defrosting mode of the heat pump mode is operated in the case that frosting is formed on the outdoor heat exchanger 130 and it is necessary to carry out defrosting. As shown in FIG. 5, the second bypass line R2 is opened by the second direction changing valve 192 and the first bypass line R1 is opened by the first direction changing valve 191.

Additionally, the dehumidification line R3 is closed by the on-off valve 195 and the refrigerant is expanded through the orifice 128 of the first expansion valve 120, such that the heat pump system is converted into an indoor air inflow mode to induce the indoor air into the air-conditioning case 150.

In the meantime, the coolant heated by the vehicle electronic units 200 is supplied to the coolant heat exchanger 181b of the chiller 180.

Furthermore, in the defrosting mode, the temperature adjustable door 151 inside the air-conditioning case 150 closes the path bypassing the indoor heat exchanger 110, so that the air blown into the air-conditioning case 150 by the blower is changed into warm air while passing through the indoor heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is induced into the indoor heat exchanger 110 mounted inside the air-conditioning case 150.

The gas-phase refrigerant of high-temperature and high-pressure induced into the indoor heat exchanger 110 is condensed while exchanging heat with the air blown into the air-conditioning case 150 by the blower, and in this instance, the air passing through the indoor heat exchanger 110 is converted into warm air and supplied to the interior of the vehicle to thereby heat the interior of the vehicle.

Continuously the refrigerant discharged from the indoor heat exchanger 110 is supplied to the second refrigerant heat exchanger 181c of the chiller 180, and the refrigerant supplied to the second refrigerant heat exchanger 181c of the chiller 180 is additionally cooled and condensed while exchanging heat with the refrigerant of low-temperature and low-pressure, which is discharged from the outdoor heat exchanger 130 and flows through the first refrigerant heat exchanger 181a, and then, flows to the first expansion valve 120.

The refrigerant flowing to the first expansion valve 120 is decompressed and expanded to become a liquid-phase refrigerant of low-temperature and low-pressure while passing through the orifice 128, and then, bypasses the outdoor heat exchanger 130 while flowing to the second bypass line R2.

After that, the refrigerant passing the second bypass line R2 passes through the first bypass line R1 by the first direction changing valve 191. In this instance, the refrigerant passing the first bypass line R1 receives a heat source to be evaporated by exchanging heat with the coolant passing through the coolant heat exchanger 181b and the refrigerant passing through the second refrigerant heat exchanger 181c while passing through the first refrigerant heat exchanger 181a of the chiller 180 so as to be evaporated, and then, is induced into the compressor 100 to recirculate the above cycle.

What is claimed is:

1. A vehicular heat pump system, which comprises: a compressor mounted on a refrigerant circulation line for compressing and discharging refrigerant; an indoor heat exchanger mounted inside an air-conditioning case for exchanging heat between air inside the air-conditioning case and the refrigerant discharged from the compressor; an evaporator mounted inside the air-conditioning case for exchanging heat between the air inside the air-conditioning case and refrigerant supplied to the compressor; an outdoor heat exchanger mounted outside the air-conditioning case for exchanging heat between the refrigerant circulating through the refrigerant circulation line and outdoor air; a first expansion valve mounted on the refrigerant circulation line at an inlet of the outdoor heat exchanger; and a second expansion valve mounted on the refrigerant circulation line at an inlet side of the evaporator to expand the refrigerant, further comprising:
a first bypass line connecting the refrigerant circulation line at an inlet side of the second expansion valve with the refrigerant circulation line at an outlet side of the evaporator, such that the refrigerant circulating through the first bypass line bypasses the second expansion valve and the evaporator;
a first direction changing valve mounted at a branch point of the refrigerant circulation line and the first bypass line; and
a chiller for exchanging heat between coolant which circulates through vehicle electronic units, refrigerant which flows through the first bypass line, and refrigerant which is discharged from the indoor heat exchanger;
wherein the chiller includes a coolant heat exchanger connected with the vehicle electronic units through a coolant line, a first refrigerant heat exchanger connected with the first bypass line, and a second refrigerant heat exchanger connected with the refrigerant circulation line of an outlet side of the indoor heat exchanger and an inlet side of the first expansion valve;
wherein a flow of the refrigerant circulating through the heat pump system is controlled by the first direction changing valve depending on an air-conditioning mode and a heat pump mode;
wherein in the air-conditioning mode, the first direction changing valve closes flow in the refrigerant circulation line from the outdoor heat exchanger to the first bypass line and opens flow in the refrigerant circulation line from the outdoor heat exchanger toward the second expansion valve such that the refrigerant discharged from the compressor circulates through the indoor heat exchanger, the second refrigerant heat exchanger of the chiller, the outdoor heat exchanger, the second expansion valve, and the evaporator in order;
wherein in the heat pump mode, the first direction changing valve opens flow in the refrigerant circulation line from the outdoor heat exchanger to the first bypass line and closes flow in the refrigerant circulation line from the outdoor heat exchanger toward the second expansion valve such that the refrigerant discharged from the compressor circulates through the indoor heat exchanger, the second refrigerant heat exchanger of the chiller, the first expansion valve, the outdoor heat exchanger and the first refrigerant heat exchanger of the chiller in order;
wherein in the air-conditioning mode, the refrigerant of high-temperature and high-pressure discharged from the indoor heat exchanger is first cooled in the chiller, and then, is second cooled in the outdoor heat exchanger so as to increase subcooling and expand the refrigerant flow rate, thereby improving cooling performance and reducing power consumption;
wherein in the heat pump mode, the refrigerant of high-temperature and high-pressure discharged from the indoor heat exchanger ensures subcooling through heat exchange with the refrigerant discharged from the outdoor heat exchanger in the chiller so as to increase the refrigerant flow rate, and the refrigerant of low-temperature and low-pressure discharged from the outdoor heat exchanger receives additional heat source from the chiller so as to increase heating performance;

wherein the chiller condenses the refrigerant in the air-conditioning mode, and the chiller condenses the refrigerant discharged from the indoor heat exchanger and evaporates the refrigerant discharged from the outdoor heat exchanger in the heat pump mode.

2. The vehicular heat pump system according to claim 1, wherein the chiller is configured in such a way that the first refrigerant heat exchanger is arranged between the coolant heat exchanger and the second refrigerant heat exchanger, and wherein the refrigerant which is discharged from the outdoor heat exchanger and flows through the first refrigerant heat exchanger exchanges heat between the coolant of the coolant heat-exchanging unit and the refrigerant of the second refrigerant heat exchanger.

3. The vehicular heat pump system according to claim 1, wherein a second bypass line is mounted on the refrigerant circulation line to connect the refrigerant circulation lines of the inlet and outlet sides of the outdoor heat exchanger, such that the refrigerant circulating through the refrigerant circulation line bypasses the outdoor heat exchanger, and wherein the first bypass line and the second bypass line are mounted in parallel on the refrigerant circulation line.

4. The vehicular heat pump system according to claim 3, wherein, on the refrigerant circulation line, a second direction changing valve is mounted at a point where the second bypass line is branched, and wherein a flow of the refrigerant circulating through the heat pump system is controlled by the first direction changing valve and the second direction changing valve depending on the air-conditioning mode and the heat pump mode.

5. The vehicular heat pump system according to claim 4, wherein, in the heat pump mode, when it is detected that frosting has occurred on the outdoor heat exchanger, the refrigerant flow is controlled in such a way that the refrigerant passing through the first expansion valve flows to the second bypass line so as to bypass the outdoor heat exchanger.

6. The vehicular heat pump system according to claim 1, further comprising:

a dehumidification line for connecting the refrigerant circulation line at the inlet side of the evaporator with the refrigerant circulation line at the outlet side of the first expansion valve.

7. The vehicular heat pump system according to claim 6, wherein an on-off valve is mounted on the dehumidification line.

8. The vehicular heat pump system according to claim 7, wherein, in a dehumidification mode during operation of the heat pump mode, the refrigerant passing through the compressor, the indoor heat exchanger, the chiller and the first expansion valve is divided into two, and, some of the divided refrigerant circulates toward the outdoor heat exchanger and the first bypass line and some of the refrigerant circulates toward the dehumidification line and the evaporator, and then, the divided refrigerants meet together at the inlet side of the compressor.

9. The vehicular heat pump system according to claim 1, wherein the first expansion valve comprises: an on-off valve which makes a refrigerant passage on or off by operating a valve member through a solenoid; and an orifice formed at the valve member, wherein the first expansion valve makes the refrigerant flow in an unexpanded state through the passage when the valve member opens the passage and makes the refrigerant flow in an expanded state through the orifice when the valve member closes the passage.

* * * * *